No. 870,010. PATENTED NOV. 5, 1907.
F. BOWEN.
BALING PRESS.
APPLICATION FILED SEPT. 13, 1906.

4 SHEETS—SHEET 1.

Witnesses

Frank Bowen Inventor by

Attorneys

No. 870,010. PATENTED NOV. 5, 1907.
F. BOWEN.
BALING PRESS.
APPLICATION FILED SEPT. 13, 1906.

4 SHEETS—SHEET 3.

Witnesses

Frank Bowen  Inventor by C. A. Snow & Co.
Attorneys

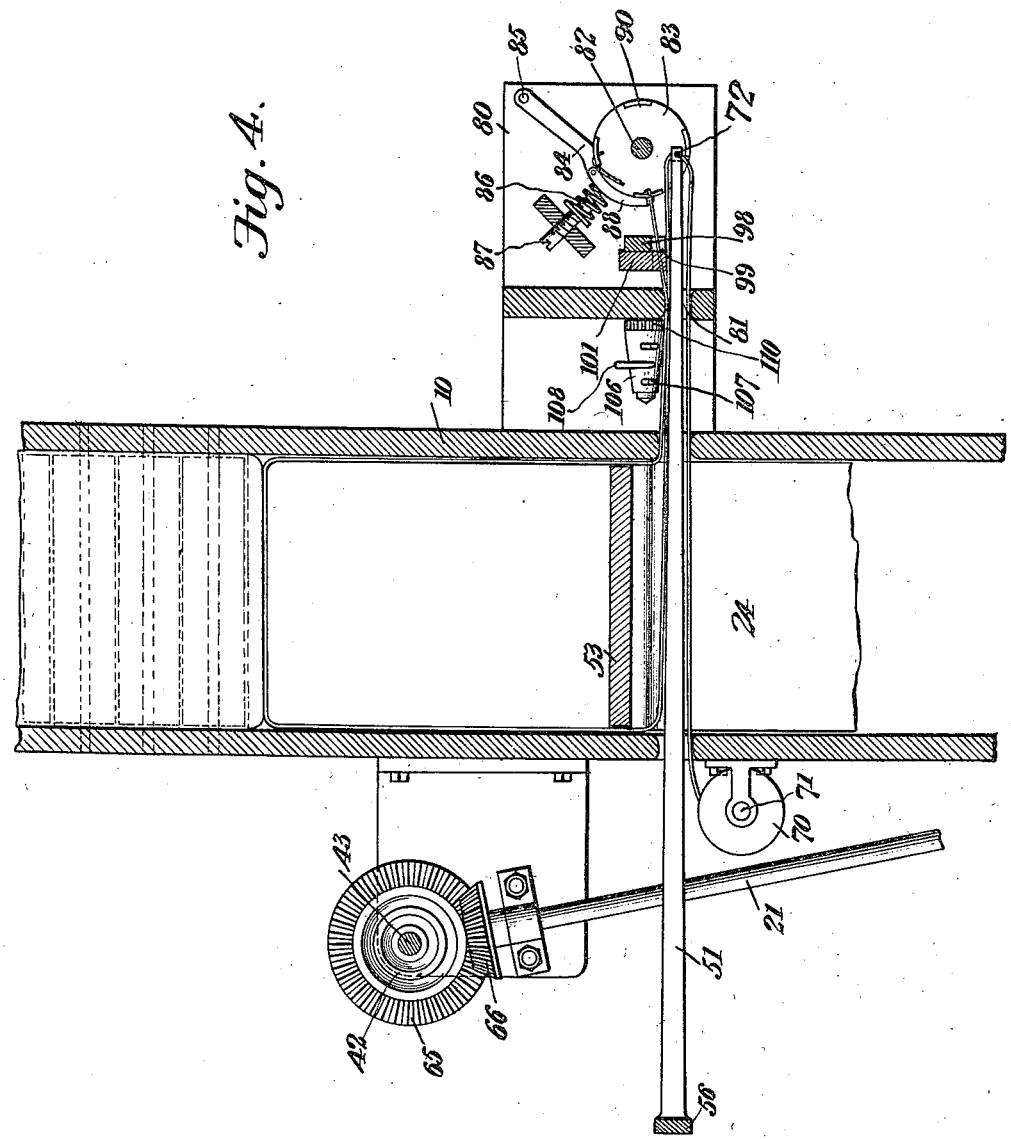

UNITED STATES PATENT OFFICE.

FRANK BOWEN, OF PURDY, MISSOURI.

BALING-PRESS.

No. 870,010.   Specification of Letters Patent.   Patented Nov. 5, 1907.

Application filed September 13, 1906. Serial No. 334,476.

*To all whom it may concern:*

Be it known that I, FRANK BOWEN, a citizen of the United States, residing at Purdy, in the county of Barry and State of Missouri, have invented a new and useful Baling-Press, of which the following is a specification.

This invention relates to apparatus for baling hay, straw, and other material, and has for one of its objects to provide a mechanism of simple character in which a baling wire or a number of baling wires, may be fed across the baling chamber at a point to the rear of the compression face of the plunger, and the opposite ends of the wire twisted or otherwise united; the plunger being provided with a passage to permit the escape of the wires after the twisting operation.

A further object of the invention is to provide a press in which the plunger has passages for the bale wires, to permit the wires to pass from side to side of the press, and is provided at the front end, or compression face with openings, which will permit the passage of the wires during, or after the twisting operation.

A still further object of the invention is to provide a press having a plunger provided with wire passages, the compression face of the plunger having pivoted doors which will open to permit the outward passage of the bale wires, and then close to form a smooth solid face for engagement with the material to be compressed.

Figure 1:
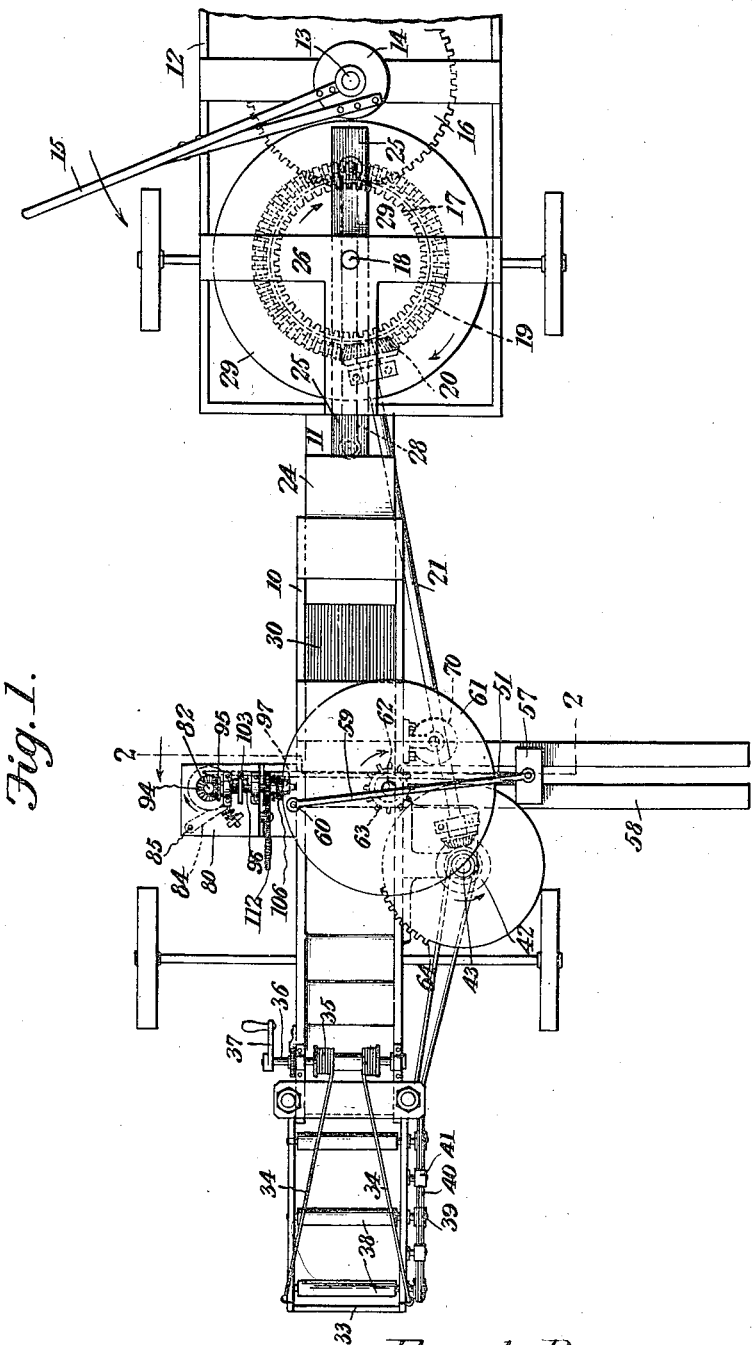
Figure 2:
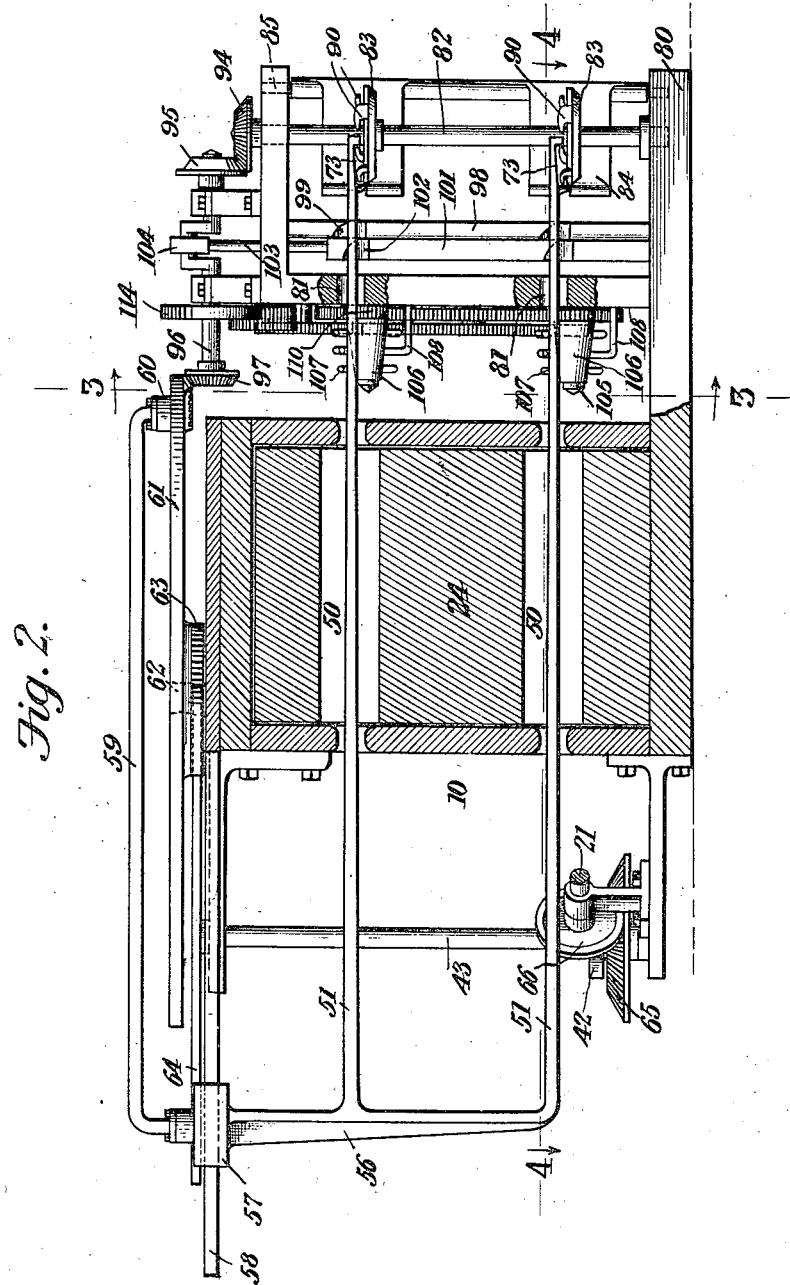
Figure 3:
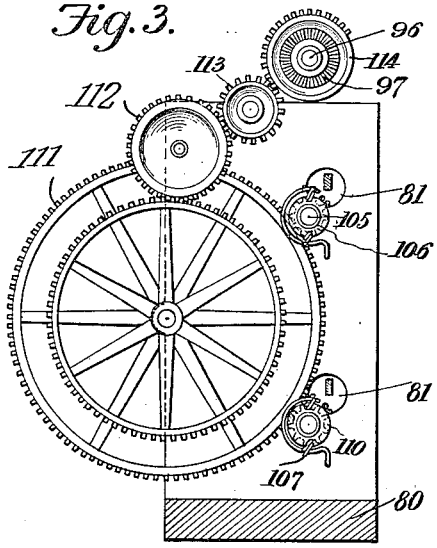
Figure 5:
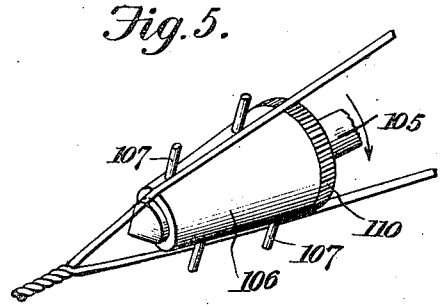
Figure 6:
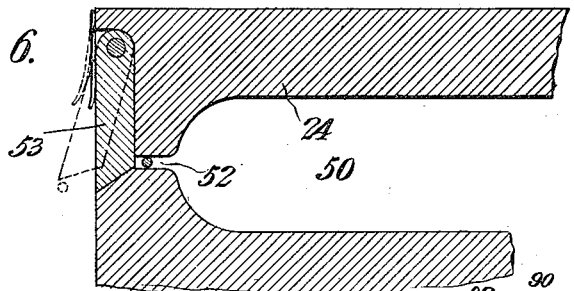
Figure 7:
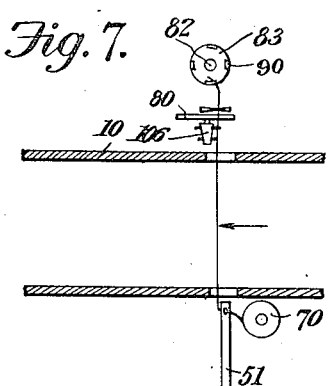
Figure 8:
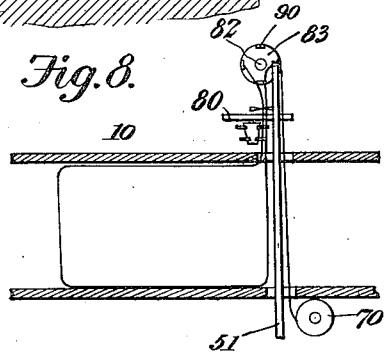

A still further object of the invention is to provide a novel form of twisting mechanism including revoluble holding devices, which receive the loops of wire fed across the baling chamber, and move said wires into alinement with the twisting devices and in the path of cutting mechanisms, which operate to sever the wire after each twisting operation.
A still further object of the invention is to construct a press having a twisting mechanism that is operated directly from the power head, so that a twisting operation will occur after a predetermined number of reciprocations of the compression plunger.
With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.
In the accompanying drawings:—Figure 1 is a plan view of a baling press constructed in accordance with the invention. Fig. 2 is a transverse sectional view of the same on the line 2—2 of Fig. 1. Fig. 3 is a vertical section, illustrating the twisting mechanism, the section being on the plane indicated by the line 3—3 of Fig. 2. Fig. 4 is a sectional plan view of the press and twisting mechanism on the line 4—4 of Fig. 2. Fig. 5 is a detail perspective view of one of the twisters detached. Fig. 6 is a sectional view on an enlarged scale through a portion of the plunger. Figs. 7 and 8 are diagrams illustrating the operation of the machine.

Similar numerals of reference are employed to indicate corresponding parts throughout the several figures of the drawings.

The press box 10 is provided with upper and lower sets of rolls to facilitate the bale forming operation, and said press box is connected by a suitable beam 11 to the frame 12 of the power head, and this frame has a vertically disposed shaft 13, to the upper end of which is secured a disk 14, and from the latter projects a sweep 15, where the device is to be operated by animal power. To the lower portion of the shaft 13 is secured a gear 16, that intermeshes with a gear 17 of a second vertical shaft 18, also journaled in the power head, and this shaft 18 further carries a bevel gear 19 that intermeshes with a bevel pinion 20 on an obliquely disposed shaft 21, through which movement is imparted from the power head to the bale wire twisting devices.

The rear end of the compression plunger 24 is provided with a guide bar 25 extending through a suitable guiding opening formed in the upper walls 26 of the power head frame, and is further connected by a pitman 28 to a crank disk 29 on the shaft 18, this mechanism serving to impart the necessary reciprocatory movement to the plunger.

The material to be compressed is inserted in the baling chamber at 30, and is operated upon in the usual manner by the plunger which forces the material toward the discharge end of the press box.

In order to add to the resistance to the movement of the material as it discharges from the press box, and thus increase the degree of compression of the bale, a pivotally mounted discharge chute 33 is arranged at the discharge end of the baling chamber, its rear end being pivotally connected to the lower portion of the baling chamber, and its front end being connected to cables or chains 34 which pass around winding drums 35 on a shaft 36 journaled at the top of the press frame. This shaft is provided with a handled crank 37 which may be turned in order to alter the angle of the chute 33, and thus increase or decrease the resistance offered to the discharge of the baled material, and at the same time permit the raising of the bale should it be necessary to discharge the latter on to a wagon or other carrier. To facilitate the discharging operation, the chute is provided with feed rolls 38, the spindles of which extend out through one side of the chute and are provided with grooved sheaves 39 for the reception of a belt 40 that is guided into contact with said sheave by idlers 41, the belt passing also around a small sheave 42 on a vertically mounted shaft 43 that constitutes a part of the actuating mechanism of the tier.

The plunger 24 is provided with horizontal slots 50 of a number equal to the number of bale wires, two in the present instance, and these extend for nearly the whole length of the plunger and are for the purpose of permitting the passage of wire carrying needles 51 by which the bale wires are fed transversely across the baling chamber, the wires passing through the slots 50, so that during the twisting operation a portion of the plunger is practically included with the bale, the bale wire escaping through a contracted passage 52 in the face of the plunger. Each of the passages 52 is normally closed by a pivotally mounted spring held door 53, so that a practically smooth, solid face is formed for engagement with the material to be compressed. The doors, however, will open to an extent sufficient to permit the passage of the wires during, or immediately after the twisting operation.

The two needles 51 are carried by a vertically disposed bar 56, the upper end of which is secured to a cross head or slide block 57 adapted to suitable guiding bars 58 projecting laterally from the top of the press box. The cross head is connected by a link 59 to a crank pin 60 on a mutilated gear 61 that is carried by a vertically disposed shaft 62, the shaft being journaled in bearings on the top of the press box. This shaft 62 carries a pinion 63 that is engaged by a mutilated gear 64 carried by the vertically disposed shaft 43, and at the lower end of the shaft 43 is a beveled gear 65, intermeshing with a bevel pinion 66 on the obliquely disposed transmission shaft 21.

It will be seen that owing to the mutilated gear 64 and the relative proportions of the several gears that the power head may be rotated a number of times, seven or eight for example, to compress enough material to form a bale, and then during the final operation the teeth of the mutilated gear 64 will engage with and revolve the pinion 63 and impart a single rotative movement to the shaft 62, and thus effect a single reciprocatory movement of the needle carrying block 57.

The baling wire is carried by reels 70, mounted on a vertical spindle 71 at the left hand side of the press, or that side on which the transmission shaft 21 is disposed, and the wires pass along and under the needles to the free ends thereof, and thence extend through eyes 72 in the needles. Immediately to the rear of each eye the needle is recessed, as indicated at 73, so that a portion of the wire is stretched across the mouth of the recess, and is in a position to be engaged by one of the wire holders, and retained while the needle starts on its rearward movement. At the right hand side of the press is arranged the frame 80 of the twisting mechanism, and in the vertical portion of the frame are arranged openings 81 for the passage of the two wire needles.

The frame 80 is provided with bearings for a vertically disposed shaft 82 carrying two disks 83, one for each of the needles, and so arranged that their upper faces are immediately below the lower edges of said needles, the latter passing over the disks at each operation. Bearing against the peripheries of the disks is a wire clamping plate 84 that is pivoted on a pin 85 carried by the frame, the plate having a concaved surface to follow closely the peripheries of the disks, being held in engagement therewith by a spring 86, the stress of which may be adjusted by a suitable screw 87. This presser plate is preferably formed of two members, one of which, 88, is pivoted to the other, and both are yieldably held in engagement with the disks.

Each disk carries four wire engaging fingers 90, that have pointed end portions projecting above the disk and arranged in such manner that as the latter is rotated they will pass through the space or recess 73 of the needle and engage the loop of wire stretched across the mouth of said recess, the wire being carried thence into engagement with the pivoted clamp 88 and confined between said clamp and the finger 90. As each of the disks carries four clamping fingers, and each disk receives a ninety degree movement at each operation, it follows that the clamping fingers will act in successive order when moving the wire into engagement with the clamping member 88 at a point near the entrance end thereof, and then when the second clamping finger engages a wire and moves it to the position of the first, said first clamping finger will carry its wire around into engagement with the heel of the clamping member 84, as clearly illustrated in Fig. 4, so that two wires may thus be held by the clamping devices and both of them passed over the outer edge of the clamp 88, the latter being preferably provided with guiding notches for holding said wires in proper position.

On the upper end of the shaft 82 is arranged a bevel gear 94, with which engages a mutilated bevel gear 95 on a shaft 96 held in suitable bearings at the top of the frame. This shaft is provided with a small bevel pinion 97 which meshes with the mutilated gear 61 and receives a complete rotative movement therefrom at each operation, and this movement is transmitted through the mutilated gear 95 to the gear 94, the latter receiving a ninety degree movement at each operation.

The frame carries a stationary cutting knife 98 having two notches, provided with cutting edges and arranged for the reception of the wires. These notches 99 are in alinement with the notches at the edge of the wire clamp 88. At one side of the stationary knife 98 is guided a movable knife 101 having notches 102 provided with sharpened cutting edges, and the top of the knife 101 is connected by a link 103 to a crank pin 104 carried by the shaft 96, so that at each rotative movement of the shaft the wires lying within said notches will be severed.

The frame 80 is provided with a pair of horizontally disposed spindles or studs 105 arranged adjacent to the openings 81, and on each of these is mounted a frusto conical twister head 106 provided with a pair of diametrically opposed sets of twisting pins 107. Each set of pins comprises two members arranged on lines tangential with respect to the body portion 106, and between the pins is arranged a guard 108 that extends partly around the twister and prevents accidental displacement of the wire during the twisting operation. The twisting pins are so arranged as to engage with the wire passing through the openings 81, each twister grasping two wires, and intertwisting the same. On the base of each twister is secured a gear 110 that is connected by an intermediate gear 111 to a train of gears 112, all journaled on studs carried by the frame. The uppermost gear of the train intermeshes with the teeth of a gear 113 which receives motion from a mutilated gear 114 on the shaft 96, said gear 114 having teeth for approximately one half of its periphery and serving at each movement to impart a complete rotative movement to the gear 113, and this movement is transmitted to the twisters in order to effect any desired number of rotations of the latter.

In the operation of the device, the compression of the bale proceeds in the usual manner until at the end of a predetermined number of compression movements of the plunger, the gear 64 engages with the pinion 63 and rotates the latter, thus rotating gear 61 and imparting movement through crank 60 and rod 59 to the needle carrying block 57. The needles are thrust across the baling chamber through the slots 50 of the plunger, and the wires carried thereby are presented above the disks 83. At the proper moment one of the fingers 90 of each disk will engage the wire and move the same into engagement with the wire clamp 88. It is to be noted that from a previous operation, the end of a wire has been held in a preceding finger 90, and is moved thereby into engagement with the heel portion of the clamp 84, so that the two wires held by the two clamping members 90 then extend through the notches of the cutter, and are disposed in the path of movement of the twister pins. The twisters are immediately started into operation, and the wires are twisted together. During this operation their ends are held by the clamps, and the tendency, therefore, is for the wire which extends across the plunger slot to pass through the opening 52 in the compression face of the plunger, and this will be accomplished to an extent proportionate to the amount of twist given the wire, but if the twist is not sufficient for the purpose, the rearward movement of the plunger will immediately cause the wire to pass out through the opening. At the completion of the twisting operation the wires are severed at the operation of the vertical movable cutter 101, it being noted that one end of the wire it still held between one of the fingers 90, and the clamp 88. The needles, however, retreat during the twisting operation and carry the wire across the baling chamber and through the plunger, so that as the latter recedes the wire extending transversely across the baling chamber will pass through the opening 52, and be disposed in a position in advance of the plunger in readiness to receive the first part of the next bale.

Having thus described the invention, what is claimed is:—

1. In a baling press, a compression plunger having in its forward face a transverse slot for the passage of a wire carrying needle, a spring actuated closure for said slot, a wire twisting mechanism arranged at the opposite side of the machine, a crank disk arranged at the top of the machine and having a wrist pin, a rod connecting the wrist pin to the needle, a gear on the crank disk, a mutilated gear engaging the crank disk gear, a plunger actuating mechanism including gearing connections, means for transmitting movement from said gearing connections to the mutilated gearing, a mutilated gear carried by the crank disk, a wire twisting mechanism arranged at that side of the machine opposite the needle, wire clipping and gripping means associated with the twisting mechanism, and means for transmitting movement from the mutilated gear of the crank disk to the wire twisting, clipping and gripping mechanisms.

2. The combination with a baling press, of a wire gripping device comprising a plurality of gripping fingers arranged to successively engage the wire, a revoluble carrier for said fingers, and a pivotally mounted spring pressed clamping member formed in sections for coöperation with successive fingers.

3. A wire gripping device comprising a revoluble disk, a plurality of wire engaging fingers carried thereby and operable in successive order, and a spring pressed wire clamp curved to conform to the periphery of the disk, and yieldably held there against, said clamping member being formed of a plurality of sections for coöperation with successive fingers.

4. The combination with a baling press, of means for feeding the wire across the baling chamber, means for gripping the ends of the wire, a frusto-conical twisting head having a plurality of wire engaging fingers arranged to engage with and intertwist the wires at a point between the gripping devices and the bale.

5. The combination with a baling press, of a needle for carrying a bale wire across the baling chamber, a gripper engaging the wire, a twister over which the wire passes, a cutter arranged between the twister and gripper, an operating shaft geared to the twister and gripper, and a crank carried by said shaft and connected to the cutter.

6. The combination with a baling press, of a wire twister comprising a frusto-conical body portion, and a plurality of diametrically opposed pins projecting from the periphery of said body portion and arranged to be engaged by the wires to be twisted.

7. The combination with a baling press, of a pivotally mounted chute arranged at the delivery end of the baling chamber, means for adjusting the position of the chute, and driven rollers arranged in the lower portion of said chute.

In testimony that I claim the foregoing as my own, I have hereto affixed my signature in the presence of two witnesses.

FRANK BOWEN.

Witnesses:
W. T. BAILEY,
RICHARD LAIDLAW.